Patented July 13, 1954

2,683,704

UNITED STATES PATENT OFFICE 2,683,704

PREPARATION OF COLORLESS, COLOR-STABLE MASS POLYMERS OF METHYL α-CHLOROACRYLATE

Harry D. Anspon, Easton, Pa., assignor to General Aniline & Film Corporation, New York, N. Y., a corporation of Delaware No Drawing. Application December 30, 1950, Serial No. 203,784

8 Claims. (Cl. 260—89.5)

This invention relates to a method for the preparation of mass polymers of methyl α-chloroacrylate which are hard, colorless, transparent and stable to subsequent discoloration on exposure to elevated temperatures and/or actinic light.

As disclosed in U. S. patent application Serial No. 601,342, filed June 23, 1945, production of colorless mass polymers of methyl α-chloroacrylate which are stable to subsequent discoloration is rendered difficult by reason of the presence of contaminating impurities in the monomer, presumably formed by autooxidation of the monomer. Such autooxidation products apparently include methyl oxalyl chloride and cannot be eliminated by usual physical treatments such as fractional distillation because of the similarity of their boiling points with that of the ester-monomer. In accordance with the aforesaid prior application, discoloration of the resulting mass polymers was prevented by inclusion in the monomer of a small amount of a reagent such as an alcohol which converts the injurious autooxidation products to inactive compounds, thereby preventing discoloration or color-instability in the polymer. Addition of such reagents, however, tends to lower the softening point of the polymer, and in cases in which the maximum hardness and softening point are desired, the presence of such materials may prove to be a serious disadvantage for commercial production. Furthermore, unless the quantity of the color-stabilizing reagent is maintained within the limits of the solubility of its reaction products in the polymer, transparency of the polymer may be adversely affected.

It is an object of this invention to provide a method for obtaining transparent, colorless, color-stable polymers of methyl α-chloroacrylate without the addition of color-inhibiting reagents, whereby maximum transparency, hardness and softening temperature are obtained in the polymers produced.

In order to attain this object in accordance with this invention, purified methyl α-chloroacrylate, hitherto protected against oxidizing influences such as atmospheric oxygen which produce autooxidation in the monomer (e. g. a freshly prepared monomer of which the synthesis is carried out in an oxygen-free atmosphere) is cooled to a temperature of —10° C. or below, and preferably not substantially higher than —30° C.; and until it is completely polymerized, it is maintained at such temperatures at all times during which it is exposed to oxygen-containing gases; and at all times at which the temperature exceeds —10° C., oxygen-containing gases are excluded from contact therewith. For example, the purified monomer containing no autooxidation products is advantageously maintained at a temperature not substantially higher than —30° C. until and during its transfer into a mold (such transfer being made after melting any solid monomer), and the mold is sealed to exclude oxygen after first displacing any air contained therein by an inert gas such as nitrogen, so that its contents are not exposed to oxygen during subsequent polymerization at higher temperatures.

It has been found that polymers thus produced are of optimum transparency, hardness, softening point, and are colorless as well as stable to discoloration upon exposure to light, heat and atmospheric influences.

Absence of discoloration and the color-stability of the resulting polymer apparently depends on the relative inactivity of the monomer toward oxygen or air at temperatures of —10° C. or below, so that such exposure to oxygen-containing gases as may occur in handling the monomer prior to its enclosure in an oxygen-free mold does not cause any substantial autooxidation. However, if the monomer is exposed to air, even to the slight extent involved in pouring it into a mold at a temperature higher than —10° C., color-generating impurities are formed which cause discoloration of the polymer either upon polymerization or upon subsequent exposure to heat and/or actinic light.

Methyl α-chloroacrylate free from color-forming impurities and suitable for use in the process of this invention, can be obtained by appropriate purification of the freshly prepared crude ester as obtained in known processes for its preparation. The ester monomer can be prepared, for example, by heating methyl α,β-dichloropropionate at reflux temperature with an aqueous solution of a hydrogen chloride acceptor such as an alkali metal salt of a carboxylic acid (as disclosed in U. S. Patent 2,476,528) or disodium hydrogen phosphate, in the presence of a polymerization inhibitor such as hydroquinone or tertiary butyl catechol. The ester is advantageously protected from formation of color-forming impurities during the dehydrochlorination reaction by excluding air or oxygen-containing gases from the reaction apparatus. The crude ester produced can be distilled together with water from the reaction mixture, and separated from the condensate as a water-immiscible layer. Advantageously, the freshly prepared ester obtained in the aforesaid manner is cooled below −10° C., and preferably to −30° C. or lower before any substantial exposure to air. Most of the moisture contained therein can be removed on cooling to the aforesaid temperature merely by filtering out ice formed by the moisture dissolved therein.

For example, it has been found that steam distillation of methyl α-chloroacrylate and separation of the ester from the aqueous condensate layer at 0° C. yields an organic layer having a moisture content of about 0.6%. On cooling to −30° C., most of the residual moisture separates in the form of ice which can be removed by filtration, the remaining ester-monomer containing about 0.1% of water. The partly dried ester thus prepared can be further dried by treatment while in liquid form with an inert dehydrating agent such as anhydrous sodium sulfate or anhydrous magnesium sulfate. Final purification of the dry ester thus obtained can be effected by fractional distillaiton under reduced pressure (preferably 5 mm. or less of mercury, absolute pressure) while protecting the distilland and condensate from contact with air, and immediately cooling the purified methyl α-chloroacrylate condensate to −30° C. or less. Alternatively, the dry ester, even if it contains autooxidation products, can be purified by cooling sufficiently to effect partial freezing of the methyl α-chloroacrylate and separating the mother liquor containing contaminating impurities from the pure solid ester; or by completely freezing the dry ester, partially melting the frozen material, and separating the resulting liquor from the pure solid methyl α-chloroacrylate as disclosed in copending application Serial No. 206,117, filed January 15, 1951, of William O. Ney, Jr.

Removal of moisture by cooling to −10° C. or below and filtering out the ice which separates can be advantageously combined with the described purification by freezing out methyl α-chloroacrylate, since the ester is protected throughout such operations from substantial oxidation by contact with air by reason of the low temperatures employed, and at the same time, premature polymerization is inhibited, especially when the ester is in frozen solid form. In fact, the frozen ester can be readily preserved in a state of satisfactory purity for long periods by maintaining the temperature below the freezing point (about −37° C.).

To prepare transparent, colorless, color-stable mass polymers according to this invention, methyl α-chloroacrylate, free of contaminating color-producing impurities and maintained at a temperature not higher than −10° C., is melted, if solid, and mixed with any adjuvants desired in the polymerization (such as polymerization catalysts, e. g. benzoyl peroxide, ditertiary butyl peroxide and the like or adhesion perventatives, e. g. oily polysiloxanes or sulfosuccinic acid esters), and then poured into a mold without allowing the temperature to rise above −10° C. Before allowing the temperature to rise above the aforesaid limit, the mold is sealed against access of air, any air space remaining in the mold being filled with an inert gas such as nitrogen, and polymerization is then effected in the known manner, e. g. by irradiation with ultraviolet light and/or by heating until polymerization is completed in the presence of an added polymerization catalyst such as an organic peroxide. Air and other oxygen-containing gases are excluded from the mold until polymerization is complete, and thereupon the polymer is removed from the mold.

We have found that plates of polymerized methyl α-chloroacrylate produced in this manner are clear, transparent, colorless, and show no tendency to discolor on ageing under the influence of the atmosphere, actinic light or heat. By reason of the absence of substantial amounts of added materials, the polymer produced is characterized by optimum hardness, and the softening point is the maximum obtainable with the composition employed.

Preferred procedures in accordance with my invention are illustrated in the following examples, wherein parts and percentages are by weight.

*Example 1*

Methyl α-chloroacrylate free of color-forming impurities was obtained by fractional distillation at reduced pressure and in an atmosphere of nitrogen, of the crude dried ester-monomer freshly prepared by dehydrochlorination of methyl α,β-dichloropropionate with aqueous sodium acetate (as described in U. S. Patent 2,476,528) in an inert nitrogen atmosphere. The methyl α-chloroacrylate condensate obtained in said distillation was cooled, as soon as it collected, to freezing temperature (e. g. by using a mixture of solid carbon dioxide and acetone as an external cooling medium), and was maintained in frozen condition to prevent polymerization and autooxidation. A portion of the frozen monomer was allowed to melt, and poured into a glass polymerization tube in which it was sealed after displacing residual air with purified nitrogen, before allowing the temperature of the monomer to rise above −30° C. The monomer in the tube was irradiated at a temperature from 0 to 20° C. with ultraviolet light for 24 hours to effect polymerization. Polymerization was completed by heating at about 120° C. for 24 hours. On cooling and removing the polymer from the tube, the product was found to be hard, clear and colorless, and failed to develop color upon extended exposure to actinic light and air.

*Example 2*

Dry methyl α-chloroacrylate, free from color-forming impurities, prepared and distilled under reduced pressure as described in Example 1, was cooled to freeze the ester-monomer as soon as it was collected as a condensate. While maintaining the frozen monomer under an atmosphere of purified nitrogen, it was allowed to melt, and without raising the temperature substantially above the freezing point, the liquid monomer was forced by nitrogen pressure through a filler tube into a mold constructed of two parallel glass plates, spaced apart in face-to-face relation, and joined at their edges of a flexible inert sealing strip interrupted at one point to provide a filler opening. The ester-monomer was allowed to come in contact with air in the mold during the filling operation, during which the ester remained at a temperature below −30° C. After filling the mold so as to displace all of the air therein, the mold was sealed and polymerization effected by irradiation with ultraviolet light at 0 to 20° C. The temperature rose spontaneously to about 55° C. as polymerization progressed, and polymerization was finally completed as in the preceding example, by heating at 120° C. for about 72 hours. Upon removing the molded methyl α-chloroacrylate polymer plate from the glass mold, a clear, transparent, colorless sheet was obtained having outstanding hardness and maximum softening point, which did not become discolored upon prolonged exposure to light and air.

For purposes of comparison, a second portion of the monomer employed in this example was polymerized in the same manner, except that instead of maintaining it at a temperature not higher than −30° C. during the mold filling operation, the ester-monomer was allowed to come to room temperature (about 20° C.) in a nitrogen atmosphere, and then poured into the mold at room temperature without protection from air during the pouring operation. Upon polymerization of the mold contents, a polymer sheet was obtained having yellowish discoloration.

On the other hand, repetition of the procedure of this example in which the technique differed in that 5 cc. of air were bubbled through 400 cc. of the ester-monomer while maintaining a temperature not substantially higher than −30° C. and just prior to pouring the ester-monomer into a mold, a colorless, color-stable polymer was obtained.

It is thus apparent that the color-stability and absence of discoloration in the polymers prepared according to this invention, despite such exposure to air as occurs in pouring the monomer into a mold, is due to the reduced reactivity of the monomer toward oxygen-containing gases at the low temperatures employed in accordance with this invention.

As a further demonstration of this fact, purified methyl α-chloroacrylate, maintained in frozen state, was just melted, transferred to a Dewar flask, open to the air, and stored in the dark in liquid form while maintaining the molten ester at a temperature adjacent its freezing point by external cooling of the flask with solid carbon dioxide. On transferring the melted ester to the Dewar flask, its freezing point was determined to be −36.75° C., while after standing in liquid form exposed to air in the flask at a temperature adjacent the freezing point for about 16 hours, the freezing point was found to be −36.87° C., indicating contamination to the extent of only 0.4 mol per cent.

Instead of carrying out polymerization with ultraviolet light, an organic peroxide such as benzoyl peroxide or ditertiary butyl peroxide can be added to the monomer in small amounts (e. g. 0.01 to 0.1% of the weight of the monomer) and polymerization effected by heating first at moderate temperatures (e. g. 55 to 60° C.) and then at a final curing temperature (e. g. at about 120 to 130° C.).

By the procedure of this invention, monomeric methyl α-chloroacrylate free of contaminating autooxidation products can be preserved for substantial periods and then cast or mass polymerized to a clear, colorless, color-stable polymer without addition of any compound to inhibit discoloration, simply by maintaining the monomer at a temperature of −10° C. or below at all times during which the monomer is exposed to air or other oxygen-containing gases.

Variations and modifications which will be obvious to those skilled in the art, can be made in the procedures described above, without departing from the scope or spirit of the invention.

I claim:

1. In a process for producing a hard, transparent, colorless, color-stable mass polymer of methyl α-chloroacrylate in which the monomer is exposed at least temporarily to an oxygen-containing gas, the improvement which comprises maintaining monomeric methyl α-chloroacrylate, free from autooxidation products, at a temperature not higher than −10° C. at all times during which said monomer is exposed to an oxygen-containing gas, and excluding oxygen from contact with said monomer at all times at which its temperature exceeds −10° C. as well as during the polymerization thereof, until such polymerization is substantially complete.

2. In a process for producing a hard, transparent, colorless, color-stable mass polymer of methyl α-chloroacrylate in which the monomer is exposed at least temporarily to an oxygen-containing gas, the improvement which comprises maintaining monomeric methyl α-chloroacrylate, free from autooxidation products, at a temperature not substantially higher than −30° C. at all times during which said monomer is exposed to an oxygen-containing gas, and excluding oxygen from contact with said monomer at all times at which its temperature substantially exceeds −30° C. as well as during the polymerization thereof, until such polymerization is substantially complete.

3. In a process for producing a hard, transparent, colorless, color-stable mass polymer from moisture-containing monomeric methyl α-chloroacrylate in which the monomer is exposed at least temporarily to an oxygen-containing gas, the improvement which comprises cooling the moisture-containing monomer, free from autooxidation products, to a temperature above its freezing point but not higher than −10° C. while protecting the monomer from contact with oxygen-containing gases, separating ice crystals from the liquid monomer at a temperature within the aforesaid range, and thereafter maintaining the monomer at a temperature not higher than −10° C. at all times during which the monomer is exposed to an oxygen-containing gas, and excluding oxygen from contact with said monomer at all times at which its temperature exceeds −10° C. and during polymerization thereof, until such polymerization is substantially complete.

4. In a process for producing a hard, transparent, colorless, color-stable mass polymer of methyl α-chloroacrylate, involving purification of dry monomeric methyl α-chloroacrylate containing autooxidation products by subjecting the monomer to freezing temperatures so as to form a mixture of liquid and solid fractions, and separating the liquid fraction containing contaminating impurities from the solid fraction, transfer of the latter monomer fraction to a mold and mass polymerization of the monomer therein, said monomer being exposed at least temporarily during the foregoing steps to an ovygen-containing gas, the improvement which comprises maintaining the monomer, thus purified by freezing out, at a temperature not substantially higher than −30° C. at all times during which said monomer is exposed to an oxygen-containing gas, and excluding oxygen from contact with said monomer at all times at which the temperature substantially exceeds −30° C. and during polymerization thereof, until such polymerization is substantially complete.

5. A process as defined in claim 4, wherein said purified monomer is maintained in solid form by holding it at temperatures not higher than its freezing point, melting the monomer and transferring it immediately to the mold while maintaining the temperature not substantially higher than −30° C., and polymerizing the monomer in the mold while excluding oxygen-containing gases from the mold, until polymerization is complete.

6. In a process for producing a hard, transparent, colorless, color-stable mass polymer of methyl α-chloroacrylate, involving dehydrochlorination of methyl, α,β-dichloropropionate in a hot aqueous reaction mixture, distillation of the monomer together with water, separation of the distilled monomer as a water-immiscible layer from the aqueous layer of the condensate, drying and fractional distillation of the resulting monomer, transfer of the monomer to a mold and polymerization of the monomer therein, said monomer being exposed at least temporarily during the foregoing steps to an oxygen-containing gas, the improvement which comprises excluding oxygen-containing gases from contact with the monomer during synthesis, distillation and handling thereof, immediately cooling the purified monomer condensate from fractional distillation to a temperature not substantially higher than −30° C., transferring the monomer to a mold at a temperature within the aforesaid range, and polymerizing the monomer in the mold while excluding oxygen-containing gases from contact therewith at all times at which the temperature is higher than −30° C., until polymerization is complete.

7. A process as defined in claim 6, wherein at least part of the moisture present in the monomer is removed by separating ice crystals from the liquid monomer at a temperature not substantially higher than −30° C.

8. A process as defined in claim 6, wherein the moisture-containing monomer, distilled from the dehydrochlorination mixture and separated from the aqueous distillate, is cooled to a temperature of −30° C., and ice crystals are separated from the liquid ester at the aforesaid temperature before the ester is subjected to fractional distillation.

References Cited in the file of this patent

UNITED STATES PATENTS

| Number | Name | Date |
| --- | --- | --- |
| 2,247,790 | Strain et al. | July 1, 1941 |
| 2,369,520 | Barnes | Feb. 13, 1945 |
| 2,476,528 | Barnes | July 19, 1949 |

FOREIGN PATENTS

| Number | Country | Date |
| --- | --- | --- |
| 549,234 | Great Britain | Nov. 12, 1942 |